United States Patent
Moulaire et al.

(10) Patent No.: US 11,453,433 B2
(45) Date of Patent: Sep. 27, 2022

(54) ADAPTATION OF A DRIFT GAIN ACCORDING TO STEERING WHEEL TORQUE IN ORDER TO IMPROVE THE FEEL OF A POWER-STEERING SYSTEM

(71) Applicant: JTEKT EUROPE, Irigny (FR)

(72) Inventors: Pascal Moulaire, La Tour de Salvagny (FR); André Michelis, Chonas l'Amballan (FR); Serge Gaudin, Saint Jean de Touslas (FR)

(73) Assignee: JTEKT EUROPE, Irigny (FR)

( * ) Notice: Subject to any disclaimer, the term of this patent is extended or adjusted under 35 U.S.C. 154(b) by 280 days.

(21) Appl. No.: 16/650,416

(22) PCT Filed: Sep. 24, 2018

(86) PCT No.: PCT/FR2018/052334
§ 371 (c)(1),
(2) Date: Mar. 25, 2020

(87) PCT Pub. No.: WO2019/058081
PCT Pub. Date: Mar. 28, 2019

(65) Prior Publication Data
US 2021/0188344 A1  Jun. 24, 2021

(30) Foreign Application Priority Data

Sep. 25, 2017  (FR) ...................................... 1758827

(51) Int. Cl.
*B62D 5/04* (2006.01)
*B62D 5/00* (2006.01)
*B62D 6/00* (2006.01)
(52) U.S. Cl.
CPC ............ *B62D 5/0463* (2013.01); *B62D 5/006* (2013.01); *B62D 6/00* (2013.01)

(58) Field of Classification Search
None
See application file for complete search history.

(56) References Cited

U.S. PATENT DOCUMENTS 5,473,231 A * 12/1995 McLaughlin ............ B62D 6/10
                                                        318/432
6,046,560 A *  4/2000 Lu ........................ B62D 5/0472
                                                        388/906
(Continued)

FOREIGN PATENT DOCUMENTS

DE      102 21 616 A1    4/2003
EP         1316494 A1 *  6/2003 ........... B62D 5/0463
(Continued)

OTHER PUBLICATIONS

Nov. 7, 2018 Search Report issued in International Patent Application No. PCT/FR2018/052334.

*Primary Examiner* — Kevin Hurley
(74) *Attorney, Agent, or Firm* — Oliff PLC

(57) ABSTRACT

A power-steering device includes a steering wheel and an assistance motor controlled by a controller which uses at least one closed-loop control law ensuring an adjustment of the steering wheel torque, the controller including at least one feedback arm which calculates a drift component by measuring or assessing an actual force parameter corresponding to the actual steering wheel torque, by next calculating a time drift value of the actual force parameter, and then multiplying the time drift value by a drift gain, wherein the controller uses three-dimensional cartography to adjust the drift gain according to a portion of the actual force parameter and the longitudinal velocity of the vehicle, according to a first domain, referred to as "parking domain", which extends from a longitudinal vehicle velocity of zero to a predetermined longitudinal velocity threshold, and a (Continued)

second domain, referred to as "driving domain", which extends beyond the longitudinal velocity threshold.

11 Claims, 1 Drawing Sheet

(56) References Cited

U.S. PATENT DOCUMENTS

| | | | | |
|---|---|---|---|---|
| 6,107,767 | A * | 8/2000 | Lu ........................ | B62D 5/0463 |
| | | | | 318/432 |
| 6,631,781 | B2 * | 10/2003 | Williams ............. | B62D 5/0463 |
| | | | | 180/443 |
| 6,876,911 | B2 * | 4/2005 | Chen .................... | B62D 5/0463 |
| | | | | 701/41 |
| 2002/0116105 | A1 | 8/2002 | Chen et al. | |

FOREIGN PATENT DOCUMENTS

| | | |
|---|---|---|
| EP | 2 184 217 A2 | 5/2010 |
| JP | H10-291481 A | 11/1998 |
| WO | 2016/203171 A1 | 12/2016 |

* cited by examiner

ADAPTATION OF A DRIFT GAIN ACCORDING TO STEERING WHEEL TORQUE IN ORDER TO IMPROVE THE FEEL OF A POWER-STEERING SYSTEM

The present invention concerns the power steering devices.

It concerns more particularly the power steering devices comprising a steering wheel on which a driver can exert a maneuvering force, called «steering wheel torque», and within which a controller carries out a servo-control of the steering mechanism using said steering wheel torque as a regulating magnitude.

Such controllers are more and more efficient and allow in particular providing a steering wheel torque which is particularly consistent with the dynamic situation of the vehicle.

To this end, said controllers incorporate in particular increasingly numerous and complex electronic and software functions.

However, this increasing complexity makes said controllers more and more difficult to configure, sometimes at the risk that, in some situations, these controllers provide the driver with a feeling of a quite artificial driving, which can be unpleasant or even counter-intuitive.

The objects assigned to the invention consequently aim at overcoming the aforementioned drawbacks and at proposing a new type of controller which, while ensuring stability, responsiveness and accuracy of the power steering system, provides the driver, on the one hand, with an excellent driving comfort and, on the other hand, with a feeling of the behavior of said power steering system, as well as a feeling of the interaction of said steering mechanism with the road, which is the most natural and the most useful information-bearing possible.

The objects assigned to the invention are achieved by means of a power steering device comprising a steering wheel on which a driver can exert a maneuvering force, called «steering wheel torque», as well as an assist motor controlled by a controller which uses at least one closed-loop control law ensuring a regulation of said steering wheel torque, said controller comprising at least one feedback branch, called «derivative branch», which calculates a component called «derivative component» by measuring or by evaluating an actual force parameter which corresponds to the actual steering wheel torque, or to a magnitude which is an image of the actual steering wheel torque whose value and variations are correlated to the value and variations of said actual steering wheel torque, then by calculating a time derivative value of said actual force parameter, then by calculating a time derivative value of said actual force parameter, then by multiplying said time derivative value by a derivative gain, said device being characterized in that the controller uses a three-dimensional mapping to adjust the derivative gain as a function, on the one hand, of the actual force parameter, and on the other hand, of the vehicle longitudinal speed.

Advantageously, the use of a derivative gain mapping using several input parameters, herein at least two input parameters, namely the actual force parameter and the longitudinal speed parameter, allows optimizing the automatic adjustment of the derivative gain depending on several input parameters which accurately and completely characterize the vehicle life situation.

Thus, the derivative gain can be adapted accurately for each different life situation of the vehicle, so as to favor the behavior and the feeling of the power steering system which will be the most suitable for the considered life situation.

The invention therefore allows associating, to each vehicle life situation, duly characterized by the different input parameters which are used in the composition of the mapping, a derivative gain which corresponds to the best possible compromise, in the considered situation, between the different stability, comfort, accuracy, responsiveness, and quality requirements of the feeling.

Other objects, features and advantages of the invention will appear in more detail on reading the following description, as well as using the appended figures, provided by purely illustrative and non-limiting way, among which:

The present invention concerns a power steering device 1.

Figure 1:
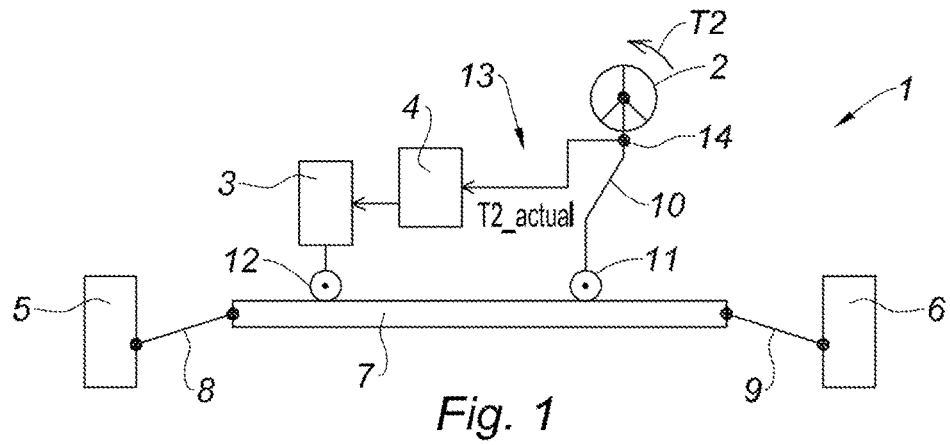
FIG. 1 illustrates, in a schematic view, a power steering device according to the invention.

Said device comprises, in a manner known per se, and as illustrated in FIG. 1, a steering wheel 2 on which a driver can exert a maneuvering force, called «steering wheel torque» T2.

Said device 1 also comprises an assist motor 3 controlled by a controller 4.

The assist motor 3 is preferably an electric motor, for example of the brushless type.

The controller 4 uses at least one closed-loop control law which ensures a regulation of the steering wheel torque T2.

In practice, the controller 4 determines, from different parameters which allow characterizing a dynamic situation of the vehicle at a considered time, a steering wheel torque setpoint T2_set which corresponds to the torque that the driver should in principle feel in the steering wheel 2 in the considered situation.

The controller 4 then considers the deviation (the difference)

$$\Delta T2 = T2\_set - T2\_actual$$

between said torque setpoint T2_set and the actual steering wheel torque T2_actual, then deduces therefrom, by means of an appropriate assistance law, an assist setpoint, that said controller applies to the assist motor 3 so as to converge the actual steering wheel torque T2_actual to the steering wheel torque setpoint T2_set.

Of course, the power steering device 1 can comprise, in a manner known per se, a steering mechanism which allows changing the orientation of a steered wheel, or preferably of at least two steered wheels 5, 6.

The steering mechanism may include, to this end, a rack 7, guided in translation in a steering casing, and whose ends are connected to steering rods 8, 9 which control the yaw orientation of stub axles carrying the wheels 5, 6.

The steering wheel 2 can preferably be engaged on the rack 7 by means of a steering column 10 carrying a drive pinion 11.

The assist motor 3 can in turn drive the steering mechanism, and more preferably the rack 7, by meshing, preferably via a transmission member 12, of a gear reducer or ball screw type, either on the steering column 10, or directly on the rack 7.

The controller 4 comprises at least one feedback branch 13, called «derivative branch», which calculates a component called «derivative component» Cd by measuring or by evaluating an actual force parameter which corresponds to the actual steering wheel torque T2_actual, or which corresponds to a magnitude which is an image of the actual steering wheel torque T2_actual whose value and, respectively, variations are correlated to the value and, respectively, the variations of said actual steering wheel torque T2_actual, then by calculating a time derivative value of said actual force parameter:

$$d(T2\_actual)/dt$$

then by multiplying said time derivative value by a derivative gain Kd:

$$Cd=Kd*d(T2\_actual)/dt.$$

Preferably, the actual force parameter will be the actual steering wheel torque T2_actual. Such a choice will allow in particular facilitating the settings and the tuning of the device 1, by directly exploiting the steering wheel torque parameter T2, which corresponds in practice to what the driver immediately and directly feels through the steering wheel 2.

The actual steering wheel torque T2_actual could for example be measured by a torque sensor 14, preferably placed on the steering column 10, or even be estimated from other parameters by an appropriate estimation algorithm.

For convenience of description, actual force parameter and actual steering wheel torque T2_actual might in any case be assimilated in the following.

However, alternatively, it is possible to use in the derivative branch 13, as an actual force parameter, any magnitude which will give a true image of the actual steering wheel torque T2_actual, and for example which will be correlated to the actual steering wheel torque T2_actual by means of a well identified assistance law, such that the value of said actual force parameter (at a considered time) will be representative of the value of the actual steering wheel torque T2_actual, and that the variations in the value of said actual force parameter over a given time interval will be representative of the variations in the value of the actual steering wheel torque T2_actual over the same time interval.

Thus, for example, the rack force corresponding to the tensile/compressive force exerted by the rack 7 on the rods 8, 9, or else the torque developed by the assist motor 3, or else the assist setpoint determined by the assistance law depending on the actual steering wheel torque T2_actual might be used, as an actual force parameter T2_actual.

The time derivative will correspond herein to the first derivative, equal to the quotient of the variation d(T2_actual) of the value of the actual force parameter T2_actual, such that this variation is observed over a predetermined time interval dt, by said considered time interval dt.

Said used time interval dt will preferably correspond to the update period (duration of an iteration) of the derivative branch 13, and more generally to the update period of the closed-loop control law.

According to the invention, the controller 4 uses a three-dimensional mapping 15 to adjust the derivative gain Kd as a function, on the one hand, of the actual force parameter T2_actual (first input of the mapping), and on the other hand, of the vehicle longitudinal speed V_vehic (second input of the mapping).

The inventors have indeed found that the derivative component Cd, and therefore the derivative gain Kd, exerted an influence on different phenomena, including in particular:

The stability of the steering wheel torque servo-control carried out by the closed-loop control law, and in particular the stability relative to the disturbances, or even relative to the «steering wheel ripple», that is to say relative to the tendency, that the steering wheel has, to ripple (typically at a frequency comprised between 20 Kz and 40 Hz), in particular when the driver releases the steering wheel 2;

The maneuvering comfort and the mechanical behavior feeling of the steering mechanism in response to the driver's maneuvers, including in particular the feeling of the friction, the feeling of the viscosity, the feeling of the inertia of the steering mechanism, the feeling of the lift-off (that is to say of the force threshold that the driver should overcome to trigger the displacement of the steering mechanism), but also the feeling of the driving precision and the «phasing» (that is to say of the possible phase delay) between the variations in derive torque T2 which are controlled by maneuvers executed by the driver and the corresponding reactions of the vehicle which result in an actual and perceptible variation in the yaw rate of said vehicle;

The perception, through the steering mechanism and the steering wheel 2, of the external environment of the vehicle and the interactions between the steering mechanism (and in particular the wheels 5, 6) and the environment of the vehicle, in particular the interactions between the tires and the road, and in particular the feeling of a return torque towards the center when the steering wheel is rotated, or else the feeling of the grain of the road through the vibrations induced in the wheels by the road surface.

An adjustment of the derivative gain Kd on a case-by-case basis, depending on the life situation of the vehicle, such that this life situation is characterized by at least two input parameters (herein at least the actual force parameter T2_actual and the vehicle speed V_vehic), advantageously allows optimizing the behavior of the controller 4 in order to favor the behavior(s) which are judged the most important and therefore the most useful in the context of the observed life situation.

Figure 2:
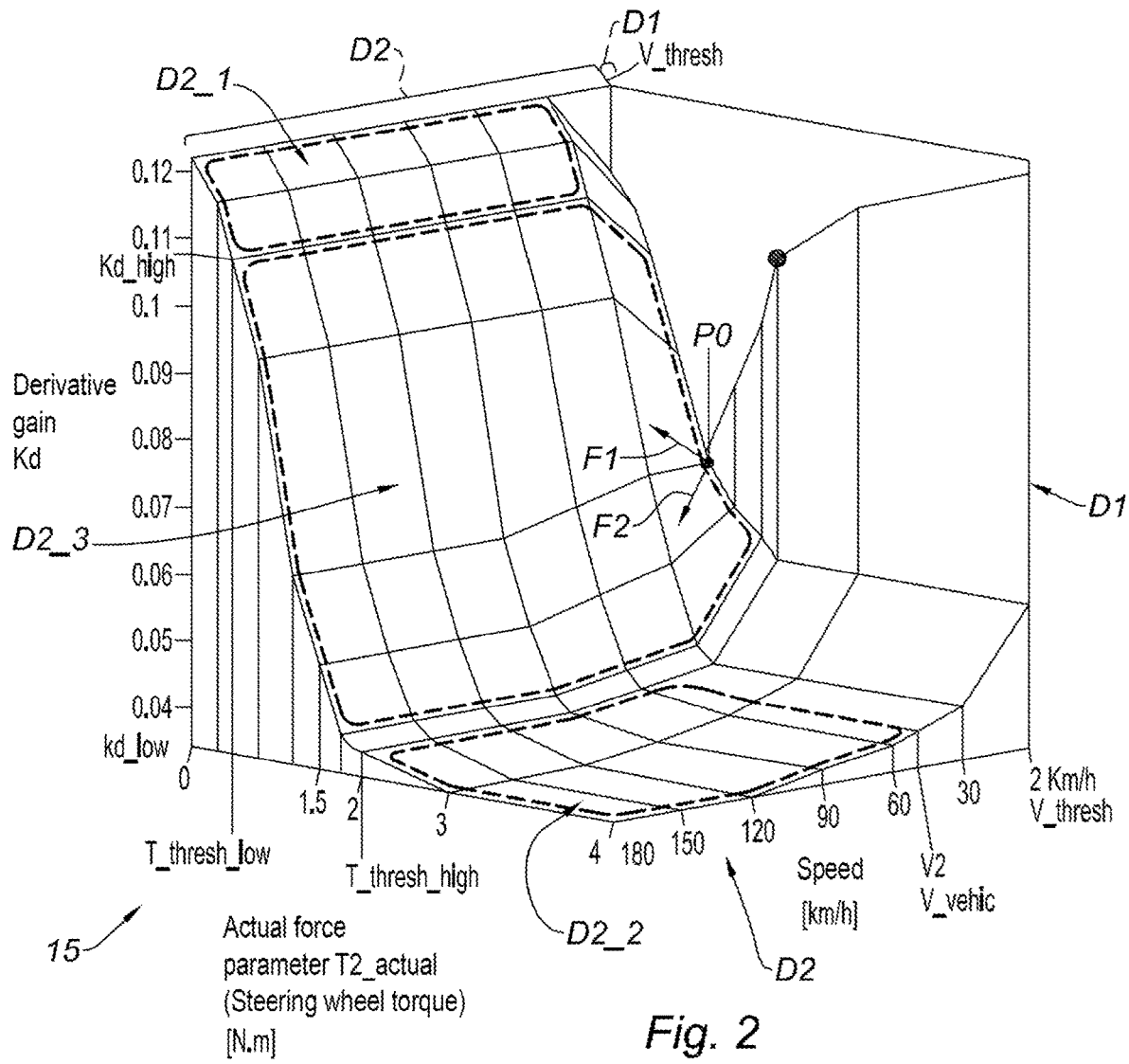
FIG. 2 illustrates a mapping allowing adjusting the derivative gain in accordance with the invention.

Preferably, the three-dimensional mapping 15 comprises, as illustrated in FIG. 2, a first domain D1, called «parking domain» D1, which extends from a zero vehicle longitudinal speed (V_vehic=0) to a non-zero predetermined longitudinal speed threshold V_thresh, and a second domain D2, called «running domain» D2, which extends beyond said longitudinal speed threshold V_thresh.

In the running domain D2, the derivative gain Kd decreases when the actual force parameter T2_actual increases, while, in the parking domain D1, the derivative gain Kd increases when the actual force parameter T2_actual increases.

Unless otherwise stated, the term «increase» indicates, in the present description, an increase in absolute value (that is to say a deviation from zero), while the term «decrease» indicates a decrease in absolute value (that is to say an approximation of zero).

Advantageously, by providing for differentiated domains D1, D2, the mapping 15 is capable of recognizing and managing different types of life situations, and of differently adjusting the derivative gain Kd depending on each considered domain.

More particularly, regardless of the longitudinal speed V_vehic, greater than the threshold V_thresh, the derivative gain Kd will preferably decrease, at the given speed V_vehic, according to a monotonic decreasing function of the actual force parameter T2_actual, and more preferentially, according to a monotonic decreasing function of the actual steering wheel torque T2_actual.

Preferably, this decreasing function will be continuous (that is to say will correspond to a continuity class function at least $C^0$), so as to favor smooth evolutions between the different life situations belonging to the running domain D2.

Similarly, in the parking domain D1, regardless of the considered longitudinal speed V_vehic (below the threshold V_thresh), the derivative gain Kd will preferably increase, at the given speed V_vehic, according to a monotonic and preferably continuous function, of the actual force parameter T2_actual.

Advantageously, in a parking situation, and therefore in situations which may require high steering wheel torques to maneuver the wheels 5, 6, and/or in which it is possible to deal, in particular when starting the vehicle, with a wide variety of adhesion conditions of the wheels 5, 6 according to the nature of the ground (dry, wet, frozen ground . . . ), such an increasing function, which increases the derivative gain Kd with the actual steering wheel torque T2_actual, will promote the stability of the power steering system 1.

Such a function will also promote the amplification of the assistance in the case of oscillating phenomena, and consequently will promote the limitation of the steering wheel ripple.

The longitudinal speed threshold V_thresh is of course selected so as to correspond in practice to a border between, on the one hand, a situation in which the vehicle is stationary, or progresses slowly in a parking maneuvering situation, and on the other hand, a situation in which the vehicle is traveling.

For this reason the longitudinal speed threshold (V_thresh) which marks the border between the parking domain D1 and the running domain D2 is preferably (in absolute value) equal to or less than 5 km/h, preferably equal to or less than 3 km/h, or even equal to or less than 2 km/h.

In FIG. 2, V_thresh=2 km/h is selected herein.

Preferentially, in order to avoid the instabilities or the jerky operation of the power steering system 1, the mapping provides for a certain continuity of the transitions between the parking domain D1 and the running domain D2, so as to guarantee a smooth operation when crossing the border represented by the longitudinal speed threshold V_thresh.

For this reason, graphically, the three-dimensional mapping 15 preferably comprises a point called «inversion point» P0, located at the border between the parking domain D1 and the running domain D2 (that is to say whose longitudinal speed coordinate is equal to the speed threshold V_thresh), and from which, if the mapping 15 is described in the direction of an increasing longitudinal speed V_vehic, in absolute value, and in the direction of a decreasing actual force parameter T2_actual, in absolute value, then the derivative gain Kd increases (vector F1 on the surface of the mapping in FIG. 2), in absolute value, while if the mapping 15 is described always in the direction of an increasing longitudinal speed V_vehic, in absolute value, but in the direction of an increasing actual force parameter T2_actual, in absolute value, the derivative gain Kd decreases (vector F2 on the surface of the mapping in FIG. 2), in absolute value.

Graphically, the inversion point P0 corresponds, for a longitudinal speed V_vehic equal to the speed threshold V_thresh, and therefore in normal projection in a projection plane defined by V_vehic=V_thresh, at the intersection, on the one hand, of the decreasing function which manages the derivative gain Kd depending on the actual steering wheel torque T2_actual in the running domain D2 and, on the other hand, of the increasing function which manages the derivative gain Kd depending on this same actual steering wheel torque T2_actual in the parking domain D1.

Conversely, on the other «slope», located on the side of the parking domain D1 relative to the inversion point P0, and starting from this same inversion point P0, a decreasing longitudinal speed V_vehic and a decreasing actual steering wheel torque T2_actual result in a decreasing derivative gain Kd, while a decreasing speed V_vehic and an increasing actual steering wheel torque T2_actual result in an increasing derivative gain Kd.

Preferably, as shown in FIG. 2, the running domain D2 comprises several sub-domains, including:

a first sub-domain called «neighborhood sub-domain of the straight line» D2_1, which extends from a zero value of the actual force parameter (T2_actual=0) to a first predetermined force threshold (T2_actual=T_thresh_low), and in which the derivative gain Kd remains greater, in absolute value, than a first gain threshold, called «ceiling threshold» Kd_high, a second sub-domain called «turning sub-domain» D2_2, which extends from and beyond a second predetermined force threshold T_thresh_high, greater (in absolute value) than the first force threshold T_thresh_low, and in which the derivative gain Kd remains less, in absolute value, than a second gain threshold, called «floor threshold» Kd_low, strictly below, in absolute value, the ceiling threshold Kd_high, a third intermediate sub-domain, called «transition sub-domain» D2_3, which extends from the first force threshold T_thresh_low to the second force threshold T_thresh_high and in which, when the actual force parameter T2_actual increases, at a given longitudinal speed V_vehic, the derivative gain Kd decreases, in absolute value, from the ceiling threshold Kd_high to the floor threshold Kd_low.

The sub-domains D2_1, D2_2, D2_3 of the running domain D2 preferably extend over a range of longitudinal speeds V_vehic whose amplitude is equal to or greater than 60 km/h, or even 90 km/h.

Preferably, said sub-domains D2_1, D2_2, D2_3 might extend at least between a low (absolute) longitudinal speed V_vehicle of 60 km/h (or less), and a high longitudinal speed which might for example correspond to the maximum vehicle speed, and/or might for example be at least 150 km/h, or even at least 180 km/h.

The general principles above describing the overall shape of the sub-domains D2_1, D2_2, D2_3 of the running domain D2 might preferably be kept over a large range of longitudinal speeds, to the speed threshold V_thresh marking the border with the parking domain D1, even if, for reasons of continuity, the floor threshold Kd_low and/or the ceiling threshold Kd_high of the derivative gain Kd might be adjusted, in this case respectively increased and decreased, when the longitudinal speed V_vehic decreases (in absolute value) below a predetermined pre-border threshold (for example V2 in the case of Kd_low), to approach the speed threshold V_thresh, as shown in FIG. 2.

The neighborhood sub-domain of the straight line D2_1, or «in center» sub-domain corresponds to a situation in which the vehicle is traveling in a straight line, or almost in a straight line, and in which the steering wheel 2, and more generally, the steering mechanism are therefore in a central position.

The steering wheel torque T2 exerted by the driver, and consequently the actual force parameter T2_actual, is therefore relatively low, even substantially zero.

A derivative gain Kd which will be sufficiently high will then be selected, in this case greater than the ceiling threshold Kd_high, to improve the comfort of the maneuvers starting from the central position, and in particular, on the one hand, to limit the lift-off force that it is necessary for the driver to implement in order to move the steering mechanism to the left or to the right, and/or on the other hand, to reduce the uncomfortable feeling caused by friction during the maneuvers. Therefore position will be towards the top of the mapping 15.

However, the derivative gain Kd will also be selected as sufficiently moderate (sufficiently low) so as not to generate a phase advance, that is to say to prevent the vehicle from reacting too quickly to a heading change, by changing its yaw rate while the driver has just begun to actuate the steering wheel 2.

The turning sub-domain D2_2, or «off center» sub-domain, corresponds to a turning situation, in which the vehicle travels with a steering wheel which has a significant steering angle, in fact non-zero, to impart to said vehicle a curved trajectory.

In such a situation, the «road feeling» will be promoted, that is to say the feeling of the road grain and of the interaction, in particular of the adhesion, between the tires of the wheels 5, 6 and the road.

To this end, a sufficiently low derivative gain Kd will therefore be chosen, in this case less than or equal to the floor threshold Kd_low, and more generally less than the derivative gain used in the vicinity of the straight line, in order to avoid adding a too significant assistance which would excessively correct the fast variations in steering wheel torque (whose frequency is typically comprised between 2 Hz and 20 Hz, even 30 Hz), and therefore which would excessively attenuate (filter) the information carried by these variations, which would degrade the road feeling.

However, the derivative gain Kd will remain sufficiently high to avoid creating a sensitivity to a «stick-slip» phenomenon of the tires, according to which the tires tend, at the start of the maneuver, to strongly hang on the ground before a quite abrupt lift-off.

This stick-slip phenomenon being all the more sensitive given that the longitudinal speed V_vehic is low, the floor threshold Kd_low of the derivative gain Kd will preferably be increased when the longitudinal speed V_vehic decreases, and in particular when the longitudinal speed V_vehic falls, in the direction of the longitudinal speed threshold V_thresh (and therefore when getting close to the parking domain D1), below a certain pre-border threshold V2, which is greater than the longitudinal speed threshold V_thresh, and noted herein V2, which pre-border threshold V2 is for example comprised between 60 km/h and 30 km/h, as shown in FIG. 2.

Generally, the turning sub-domain D2_2 might take the shape of a well, within the mapping 15.

The transition sub-domain D2_3 will correspond, in turn, to the transition situations allowing passing from a straight line situation to a turning situation, or vice versa.

In this transition sub-domain D2_3, the derivative gain Kd will therefore be gradually adjusted between the floor threshold Kd_low and the ceiling threshold Kd_high.

In a «counter-steering» situation, in which the driver releases the steering wheel 2 to let it return to the center, or else in which the driver maneuvers said steering wheel 2 to cause said steering wheel 2 to return to the center, the derivative gain Kd will be chosen so as to favor the implementation of an assist torque in the return.

As such, a relatively high derivative gain Kd can in particular be promoted. Indeed, if the driver releases the steering wheel 2, or reverses its maneuver relative to its initial turning maneuver, to bring the steering wheel to the center, there is a quick, almost instantaneous fall of the steering wheel torque T2, and therefore of the actual force parameter T2_actual.

The time derivative dT2_actual/dt will therefore be particularly high.

The higher the derivative gain Kd will be, the more this fall in the calculation of the derivative component Cd will be amplified, and therefore the more quickly the conventional assistance, which until then tended to maintain or accentuate the steering angle in the turning direction desired by the driver, will be reduced.

The return to the center of the steering wheel, which should take place in the direction opposite to the direction in which this initial assistance acted, and which would therefore be hampered if said initial assistance persisted, is therefore promoted by the application of a reinforced derivative gain Kd.

Conversely, in a steering maneuvering situation, the driver accentuates the steering angle to take a turning.

In particular, it is possible for the driver to quickly steer, thus almost carrying out a «step-input» of a steering wheel torque T2, T2_actual.

In practice, such a «step-input» maneuver can be characterized by a speed of rotation of the steering wheel equal to or greater than a threshold comprised between 150 deg/s and 300 deg/s, and can in particular correspond to an urgent maneuver of obstacle avoidance.

In such a situation, it is therefore appropriate to select a derivative gain Kd which will provide a sufficient reactivity, and therefore a moderate phase delay, between the maneuver of the steering wheel 2 and the execution of an actual change in the yaw rate by the vehicle, without causing, conversely, a too early reaction which might surprise the driver.

Preferably, in such a turning maneuvering situation, and more particularly in a «step-input» situation, the derivative gain Kd will also be adjusted depending on the vehicle longitudinal speed V_vehic so as to cause a less intense reaction at high speed than at low speed, in order to prevent the steering assist from promoting an accidental driving off-track.

Preferably, and in particular to properly manage the neighborhood situations of a straight line (sub-domain D2_1) and/or the «step-input» situations (steering wheel turning corresponding to the sub-domain D2_3), the three-dimensional mapping 15 is designed so that the resulting derivative gain Kd induces a phase delay, between a driver maneuver triggering a variation of the steering wheel torque T2, T2_actual and an actual change in the vehicle yaw rate which results from said maneuver, which is comprised between at least 50 ms, preferably at least 100 ms, and at most 300 ms, preferably at most 200 ms.

Below 100 ms (typical «sport» setting), and a fortiori below 50 ms, the power steering system 1 may surprise the driver 5 with a reaction much faster than expected.

Beyond 200 ms (typical «comfort» setting), and a fortiori beyond 300 ms, the power steering system 1 may be perceived as «soft», that is to say lacking responsiveness and accuracy, which can be disadvantageous in particular when avoiding an obstacle or else when making a series of turns, situations which require a good synchronization between the reactions of the vehicle and the steering wheel movements 2 performed by the driver.

The mapping 15 of the derivative gain could be for example empirically established by test campaigns, and/or by numerical simulations.

Of course, the present invention is not limited to the sole variants described above, those skilled in the art being in particular in position to isolate or freely combine together the one or the other of the aforementioned features.

The invention claimed is:

1. A power steering device comprising:
a steering wheel configured to be controlled by a driver by exerting a steering wheel torque on the steering wheel,
an assist motor, and
a controller controlling the assist motor and using at least one closed-loop control law to regulate the steering wheel torque, the controller including at least one feedback branch that determines a derivative component by:
measuring or evaluating an actual force parameter which corresponds to:
an actual steering wheel torque, or
a magnitude which is an representation of the actual steering wheel torque, the representation of the actual steering wheel torque being a value and variations correlated to a value and variations of the actual steering wheel torque,
calculating a time derivative value of the actual force parameter, and
multiplying the time derivative value by a derivative gain, the controller using a three-dimensional mapping to adjust the derivative gain as a function of the actual force parameter and a vehicle longitudinal speed.

2. The device according to claim 1, wherein the three-dimensional mapping includes:
a first domain which extends from a zero vehicle longitudinal speed to a non-zero longitudinal speed threshold, and in the first domain the derivative gain increases as the actual force parameter increases, and
a second domain which extends beyond the longitudinal speed threshold, and in the second domain the derivative gain decreases as the actual force parameter increases.

3. The device according to claim 2, wherein the longitudinal speed threshold which marks a border between the first domain and the second domain is equal to or less than 5 km/hr.

4. The device according to claim 2, wherein:
the three-dimensional mapping includes at least one inversion point, which is located at a border between the first domain and the second domain, and
the derivative gain:
increases from the inversion point along the mapping in a direction of an increasing longitudinal speed and in a direction of a decreasing actual force parameter, and
decreases from the inversion point along the mapping in the direction of the increasing longitudinal speed and an increasing actual force parameter.

5. The device according to claim 2, wherein the second domain includes:
a first sub-domain which extends from a zero value of the actual force parameter to a first predetermined force threshold, the derivative gain in the first sub-domain is greater than a first gain threshold,
a second sub-domain which extends from a second predetermined force threshold, the second force threshold being greater than the first force threshold, and the derivative gain in the second sub-domain is less than a second gain threshold, which is lower than the first gain threshold, and
a third intermediate sub-domain, which extends from the first force threshold to the second force threshold and when the actual force parameter increases, at a given longitudinal speed, the derivative gain decreases from the first gain threshold to the second gain threshold.

6. The device according to claim 5, wherein the second gain threshold increases when the longitudinal speed decreases, in a direction of the longitudinal speed threshold, to a value below a pre-border threshold, which is greater than the longitudinal speed threshold.

7. The device according to claim 1, wherein the three-dimensional mapping is designed so that the resulting derivative gain induces a phase delay between a driver maneuver triggering a variation of the steering wheel torque and an actual change in a vehicle yaw rate which results from the driver maneuver, the phase delay being in a range of 50 ms to 300 ms.

8. The device according to claim 2, wherein the longitudinal speed threshold is equal to or less than 3 km/h.

9. The device according to claim 2, wherein the longitudinal speed threshold is equal to or less than 2 km/h.

10. The device according to claim 6, wherein the pre-border threshold is in a range of 30 km/h to 60 km/h.

11. The device according to claim 7, wherein the phase delay is in a range of 100 ms to 200 ms.

* * * * *